United States Patent Office 3,793,432
Patented Feb. 19, 1974

3,793,432
HYDROMETALLURGICAL TREATMENT OF NICKEL GROUP ORES
David Weston, 32 Parkwood Ave.,
Toronto, Ontario, Canada
No Drawing. Continuation of application Ser. No. 869,376, Oct. 24, 1969. This application Jan. 27, 1972, Ser. No. 221,437
Int. Cl. C01g 53/00; C22b 3/00
U.S. Cl. 423—143
22 Claims

ABSTRACT OF THE DISCLOSURE

A process for the leaching of nickel bearing laterites, beneficiated laterites or other nickel bearing products wherein the leach is conducted at a temperature below the atmospheric boiling point of the pulp and nickel and cobalt are effectively dissolved while iron is prevented from remaining in solution through the use of precipitating agents capable of introducing alkali metal ion or ammonia ion to the pulp.

---

This application is a continuation of application Ser. No. 869,376, filed Oct. 24, 1969.

BACKGROUND OF THE INVENTION

This invention relates to the hydrometallurgical treatment of lateritic ores.

Attempts to recover nickel and cobalt from the nickel laterites by hydrometallurgical processes such as leaching have been hindered by the presence in the laterites of a substantial amount of iron mineral such as goethite and hematite together with complex host rock iron minerals. When subjected to a sulphuric acid leaching, for example, part of the iron readily goes into solution where it has the effect firstly of causing excessive sulphuric acid consumption and secondly of preventing more than a certain proportion of the nickel and cobalt present from going into solution. Once the iron is in solution it is very difficult and costly to separate the nickel and cobalt from the iron. This situation has resulted in commercial exploitation of the nickel laterites being generally confined to the production of ferro-nickel and in the use of pyrometallurgy and other expensive treatment steps in combinations with hydrometallurgy to reduce the iron content to an acceptably low value in the final ferro-nickel product. These processes generally employ high temperature, high pressure leaching stages which are expensive to operate and require a high capital cost outlay.

SUMMARY OF THE INVENTION

I have now found that it is possible, by properly controlling conditions and the addition of certain reagents, to conduct a leaching process at atmospheric pressures in which the nickel and cobalt are effectively dissolved while the iron is prevented from remaining in the solution, whereby a pregnant liquor is produced containing a high proportion of the cobalt and nickel present in the original lateritic ore and with a nickel to iron ratio down to as low as 50 nickel to 1 iron, from which pregnant liquor the cobalt and nickel are readily recoverable by known chemical methods including, for instance, ion exchange.

According to my invention the laterite nickel ore is comminuted to a suitable degree of fineness for leaching which will generally be about 90% minus 325 mesh and formed into a pulp of suitable consistency which would normally be as high in solids as can effectively be handled during the comminution stage. Where a dispersing agent is employed during comminution this pulp density may be as high as 50% by wt. solids whereas without a dispersing agent it may be necessary to go as low as 25% by wt. solids. The pulp is then subjected to a first leaching stage with the addition of sufficient sulphuric acid to bring the pH down to a value below about 1.5 and preferably below about 0.7 and the leaching is allowed to proceed at atmospheric pressure and temperatures varying from 70° C. to the boiling point of the pulp. This leaching stage is permitted to continue until there is a substantial concentration of iron in the solution. For instance, at a pulp density of 45% by wt. solids my preferred concentration of iron is approximately 25 grams per liter of solution, which point is generally reached after a period of approximately 16 hours. It will be appreciated that the laterites vary over a wide range in both their iron and rock content. For instance, the normal variation in the laterites is approximately 10% by wt. iron to a maximum of 45% by wt. iron. The optimum conditions of my leaching process will therefore change, within limits, depending upon the chemical composition of the laterite being treated. When the above condition has been reached, I then add to the pulp a reprecipitating agent for the iron in stage additions during the remainder of the leach, in quantities sufficient to cause controlled precipitation of the iron from the solution. As reprecipitating agents I may use any agent capable of introducing alkali metal or ammonium ions to the pulp. My preferred agents are potassium carbonate and sodium carbonate. While potassium carbonate appears to be the most effective, it is relatively high in price compared to sodium carbonate and this in many cases indicates the use of the latter for economic reasons. While the indications are that all alkali metals will produce the precipitating phenomenum, I exclude from consideration rubidium and caseium on obvious economic grounds. I may also use sodium chloride, sodium sulphate, potassium nitrate or combinations of these reagents with sodium or potassium carbonate. Generally speaking, for a particular process the choice of precipitating agent will be governed by economic factors. For instance, where the treating plant is located near the ocean, I may use sea water for the formation of my pulp and reduce materially the amount of sodium or potassium carbonate which needs to be employed in the later stages of the process.

The leach is continued until the desired economic level of solution of nickel and cobalt has been attained and at this point if the iron content of the solution is not at a usefully low level, further precipitating agent is added to complete the precipitation and bring the iron content of the solution down to the desired level.

While I have indicated that the purpose of my initial stage of leaching is to bring a desired amount of iron into solution and that the addition of the precipitating agent for iron follows this first stage, I have found that with the slower acting of the precipitating agents, such as sodium chloride, sodium sulphate and the like, the addition of a certain quantity of these reagents during the comminuting process will not prevent the concentration of iron in solution from reaching the desired level during the first stage and I prefer in many cases to make such additions during the comminution of the ore in order to decrease the amount of relatively more expensive, faster acting precipitating agents which are added at the second and subsequent stages of leaching. Further, small increments of the precipitating agent or agents may be added either to the grinding stage or during the primary leaching stage.

As it is desirable to work at as high pulp density as possible in order to control the sulphuric acid consumption and minimize plant size, I prefer to carry out the comminution with the addition of a dispersing agent or a wetting agent or both. Among the available dispersing agents, I prefer sodium silicate because of its ready availability and relatively low cost. Any wetting agent which is a powerful lowerer of surface tension and has low frothing characteristics is suitable.

The leach described generally above may be modified if desired by the introduction of various gaseous media. For instance, I have found that the introduction of sulphur dioxide accelerates both the iron and cobalt dissolution. Carbon dioxide on the other hand retards iron and cobalt dissolution and accelerates nickel dissolution. The introduction of air accelerates iron dissolution, retards iron precipitating and cobalt and nickel dissolution. Thus, while the introduction of gaseous media to the leach is not an essential feature of my process, in certain instances useful additional control of the process may be achieved with possibly some saving in operational costs, due to shortened time or reduction in acid consumption.

If as a precipitating agent a strong oxidizing agent such as potassium dichromate is employed, the rate of precipitation of iron is strongly accelerated.

It is important that the rate of precipitation of the iron be such that the concentration of iron in the solution does not drop below a certain value until the dissolution of nickel and cobalt has approached its desired end point since it appears that the dissolution rate of nickel and cobalt is adversely affected if the amount of iron in solution falls below about 1 gram per liter. However, the optimum balance between the rate of iron precipitation and the dissolution rate for cobalt and nickel will depend upon the composition of the ore being treated and will vary between laterites of different chemical composition. The results which I have achieved on the laboratory scale indicate that by using the process of the present invention recoveries of higher than 80% of the nickel and cobalt may be obtained in the pregnant solution concurrently with the final pregnant solution containing little more than a trace of iron.

EXAMPLES OF THE OPERATION OF THE INVENTION

The following examples illustrate the invention. In all of the examples the same apparatus was employed which consisted of a laboratory ball mill for comminuting the ores, a constant temperature thermostatically controlled oil bath equipped with approximately 2 liter sealable glass pots equipped with motor driven stirring devices and two pH meters equipped with special electrodes for accurate high temperature low pH readings. Samplings were taken by means of 50 and 25 cc. pipettes at prescribed intervals. The progress of cobalt and nickel dissolution was followed by analyzing the solids for undissolved cobalt and nickel. Iron in solution was determined by titrimetry and the final cobalt and nickel in solution was determined by standard quantitative analysis. All manipulative procedures were standardized throughout.

EXAMPLE I

A sample of Penarroya New Caledonia lateritic nickel ore had the following head analysis:

| | Percent by wt. |
|---|---|
| Ni | 1.38 |
| Co | 0.092 |
| Total Fe | 41.5 |
| MgO | 3.75 |
| $Al_2O_3$ | 4.25 |
| $SiO_2$ | 7.40 |

535 grams of this ore (estimated 515 to 520 grams dry) were ground for 15 minutes in the laboratory ball mill at a pulp density of 30% by wt. solids, with the addition of 10 cc. of 1% solution of a wetting agent (a trimethyl nonyl ether of polyethylene glycol) and 16 grams of sodium silicate. The resulting pulp was transferred to a testing pot on the oil bath at approximately 90° C. and conditioned for 20 hours at which time the addition of 120 cc. of 10% by wt. C.P. sulphuric acid reduced the pH of the pulp to 0.8. The conditioning was continued for 20 hours, a sample was taken for analysis and 15 grams of dry crystalline potassium carbonate was added to the pulp. An additional quantity of 5 grams of potassium carbonate was added every two hours until a total of 30 grams had been added. 20 hours after the first addition of potassium carbonate, a second sample was taken for analysis, 15 grams of potassium carbonate were added and each two hours thereafter an additional 5 grams of potassium carbonate were added until the total addition for this stage had reached 30 grams. 24 hours after the second addition of potassium carbonate was commenced, a sample was taken for analysis and samples were taken at 24 hour intervals thereafter.

The following were the metallurgical results:

| Time, hrs. | Ni, percent by wt. (in solids) | Co, percent by wt. (in solids) | Pregnant solution Fe, gms./l. | Pregnant solution Ni, gms./l. | pH |
|---|---|---|---|---|---|
| 20 | 1.30 | 0.072 | 28.8 | | 0.8 |
| 40 | 0.63 | 0.036 | 1.54 | | 1.4 |
| 64 | 0.58 | 0.033 | 0.10 | | 2.10 |
| 88 [1] | 0.59 | 0.032 | 0.15 | | 2.10 |
| 112 | 0.46 | 0.031 | 0.64 | | 1.80 |
| 136 | 0.43 | 0.030 | 0.28 | 2.28 | 1.90 |

[1] 20 cc C.P. $H_2SO_4$ were added after sample was taken.

It is to be noted that after 64 hours the iron in solution had fallen to 0.10 gm./l. and that after 88 hours the iron in solution was still only 0.15 gm./l. whereas the nickel and cobalt dissolution showed no improvement for the past 24 hours. The addition of sulphuric acid at this point can be seen to have brought the iron in solution up to 0.64 gm./l., enabling the dissolution of nickel and cobalt to proceed.

EXAMPLE II

A 835 gram sample of the same ore as that used in Example I was ground for 25 minutes in a laboratory ball mill at a pulp density of approximately 50% by wt. solids in the absence of any reagents following which the resulting pulp was transferred to a testing pot on the oil bath where 200 cc. of C.P. sulphuric acid were added to reduce the pH of the pulp to 0.7. A temperature of approximately 90° C. was maintained and the pulp was conditioned for 20 hours at which time a sample was withdrawn for analysis. Six liters of air per hour were then introduced to the pulp and the conditioning was continued for 20 hours at the end of which time a sample was taken for analysis, following which the air was turned off and 25 grams of dry crystalline sodium sulphate were added to the pulp followed by a further 25 grams three hours later. Twenty hours after the first addition of sodium sulphate a sample was taken for analysis and 25 grams of sodium sulphate were added followed four hours later by a further 25 grams. The conditioning was continued for 24 hours when a sample was taken for analysis. After a final conditioning period of another 24 hours, a further sample was taken for analysis.

The following were the metallurgical results:

| Time, hrs. | Ni, percent by wt. (in solids) | Co, percent by wt. (in solids) | Pregnant solution Fe, gms./l. | Pregnant solution Ni, gms./l. | pH |
|---|---|---|---|---|---|
| 20 | 1.22 | 0.070 | 49.2 | | 0.7 |
| 40 | 1.07 | 0.065 | 58.3 | | 1.1 |
| 60 | 0.65 | 0.035 | 31.9 | | 0.9 |
| 84 | 0.48 | 0.025 | 9.70 | | 1.2 |
| 108 | 0.37 | 0.025 | 11.3 | | 1.20 |

These results indicate the accelerating effect of the introduction of air upon the solution rate of iron and also indicate that the action of sodium sulphate as a precipitation agent is relatively mild compared to that of potassium carbonate as indicated in Example I.

EXAMPLE III

A further sample of 835 grams of the same ore as that used in Examples I and II was ground for 15 minutes in a laboratory ball mill at a pulp density of approximately 25% by wt. solids in the absence of any reagents following which the resulting pulp was transferred to a testing pot on the oil bath at a temperature of approximately 90° C. and 120 grams of sodium chloride was added following which the pulp was conditioned for 24 hours and a sample was taken for analysis. After a further period of conditioning for 20 hours a second sample was taken for analysis and 225 cc. of C.P. sulphuric acid was added and conditioning was continued for a further 20 hours and a further sample was taken for analysis. 25 grams of dry crystalline potassium carbonate were then added to the pulp and conditioning was continued for 24 hours when a sample was taken for analysis. After a further 24 hours of conditioning, the final sample was taken for analysis. The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 24 | 1.27 | 0.092 | 0.2 | | 5.85 |
| 44 | 1.25 | 0.090 | 0.1 | | 5.90 |
| 64 | 0.72 | 0.054 | 29.6 | | 0.6 |
| 88 | 0.33 | 0.029 | 2.80 | | 1.05 |
| 112 | 0.26 | 0.026 | 1.54 | | 1.2 |
| | 0.23 | 0.020 | 0.72 | 4.37 | 1.25 |

This test illustrates that initial introduction of sodium chloride does not prevent an acceptable rate of iron dissolution when sulphuric acid is added subsequently and it shows furthermore that a relatively smaller amount of potassium carbonate will under these conditions produce a satisfactory precipitation of the iron and dissolution of the nickel and cobalt.

EXAMPLE IV

A 540 gram sample of lateritic nickel ore supplied by the International Nickel Company of Canada, and having a head analysis of 1.42% by wt. nickel, 0.126% by wt. cobalt and 42.2% by wt. iron, was ground in a laboratory ball mill at a pulp density of approximately 30% by wt. solids in the presence of 75 grams of sodium chloride. The resulting pulp was transferred to a testing pot on the oil bath at a temperature of approximately 90° C. and the pulp was conditioned for two hours at which time 150 cc. of C.P. sulphuric acid were added and the pulp was conditioned for a period of 20 hours following which a sample was taken for analysis and the pulp was conditioned for a further 20 hours following which a further sample was taken for analysis. Five grams of potassium carbonate were added to the pulp and the pulp was conditioned for a further 20 hours when a further sample was taken for analysis and 11 grams of potassium carbonate were added to the pulp. After 24 hours of further conditioning a further sample was taken for analysis and 4 grams of potassium carbonate were added to the pulp and the pulp was conditioned for a further 24 hours before a final sample was taken for analysis. The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 20 | 0.71 | 0.047 | 12.4 | | 0.75 |
| 40 | 0.71 | 0.048 | 3.50 | | 0.95 |
| 60 | 0.38 | 0.025 | 0.84 | | 1.35 |
| 84 | 0.34 | 0.023 | 0.37 | 2.90 | 1.40 |
| 108 | 0.30 | 0.021 | 0.21 | 3.10 | 1.40 |

These results indicate that sodium chloride is effective as a precipitation agent and when followed with relatively small stage additions of potassium carbonate results in a very effective combination of iron precipitation and nickel and cobalt dissolution.

EXAMPLE V 870 grams of a sample of lateritic ore supplied by the International Nickel Company of Canada and having a head analysis of 1.42% by wt. nickel, 0.126% by wt. cobalt and 42.2% by wt. iron, was ground for 25 minutes in a laboratory ball mill at a pulp density of 45% by wt. solids in the presence of 32 grams of sodium silicate. The pulp was transferred to a testing pot on the oil bath at a temperature of approximately 90° C. and after four hours conditioning, 120 grams of sodium chloride were added and the pulp was further conditioned for 20 hours. 225 cc. of C.P. sulphuric acid was added, conditioning was continued for 20 hours and a sample was taken for analysis. 10 grams of potassium carbonate was added and conditioning was continued for a further 20 hours. A sample was taken for analysis, 8 grams of potassium carbonate were added and the pulp was conditioned for a further 24 hours following which a further sample was taken for analysis and a further 4 grams of potassium carbonate added. Conditioning was continued for 48 hrs. with samples taken at 24 hr. intervals.

The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 20 | 0.66 | 0.046 | 10.2 | | 0.75 |
| 40 | 0.38 | 0.046 | 0.96 | | 1.15 |
| 64 | 0.33 | 0.025 | 0.47 | | 1.40 |
| 88 | 0.30 | 0.025 | 0.37 | 5.85 | 1.60 |
| 112 | 0.27 | 0.022 | 0.26 | 6.05 | 1.65 |

This test shows the effectiveness of the combination of sodium silicate and salt followed by relatively small additions of potassium carbonate in stages.

EXAMPLE VI

Another 870 gram sample of the same ore used in Example V was ground in a laboratory ball mill for 25 minutes at a pulp density of 45% solids in the presence of 32 grams of sodium silicate. The pulp was then transferred to a testing pot on the oil bath at a temperature of approximately 90° C. and after four hours conditioning 120 grams of sodium chloride were added and the pulp was further conditioned for a period of 20 hours. 225 cc. of C.P. sulphuric acid were added and the conditioning was continued for 20 hours and a sample was taken for analysis. 10 grams of crystalline sodium sulphate were added and the conditioning was continued for a further 20 hours and a sample was taken for analysis. A second quantity of 10 grams of sodium sulphate were added and the conditioning was continued for 24 hours and a further sample was taken for analysis. A further addition of six grams of sodium sulphate was made, the conditioning was continued a further 24 hours and a final sample was taken for analysis.

The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 20 | 0.62 | 0.043 | 6.58 | | 0.75 |
| 40 | 0.53 | 0.037 | 1.81 | | 1.05 |
| 64 | 0.42 | 0.029 | 2.10 | | 1.20 |
| 88 | 0.40 | 0.027 | 1.20 | 6.87 | 1.35 |

This test shows the effectiveness of sodium sulphate as a precipitating agent permitting good dissolution of the cobalt and nickel while bringing the iron in solution down to an acceptable level. Repetitions of the same procedure employing ammonium carbonate in the one case and lithium carbonate in another case indicated that these two compounds act as precipitating agents in substantially the same manner as sodium sulphate.

EXAMPLE VII 540 grams of the same ore as that employed in Examples V and VI were ground for 15 minutes in the laboratory ball mill at 30% by wt. solids following which the pulp was transferred to a testing pot on the oil bath at a temperature of approximately 90° C., 150 cc. of C.P. sulphuric acid were added and the pulp was conditioned for a period of 20 hours following which a sample was taken for analysis. 12.5 grams of potassium nitrate were added, the conditioning was continued for 20 hours and a further sample was taken for analysis. A further quantity of 12.5 grams of potassium nitrate were added to the pulp, conditioning was continued for a further 20 hours and a further sample was taken for analysis. A further 12.5 grams of potassium nitrate were added, the pulp sample was taken for analysis after 24 hours and after continuing with the conditioning for a further 24 hours a final sample was taken for analysis.

The metallurgical results were as follows:

| Time, hrs. | Ni, percent by wt. (in solids) | Co, percent by wt. (in solids) | Pregnant solution Fe, gms./l. | Pregnant solution Ni, gms./l. | pH |
|---|---|---|---|---|---|
| 20 | 1.03 | 0.060 | 42.2 | -------- | 0.85 |
| 40 | 0.87 | 0.046 | 28.1 | -------- | 0.85 |
| 60 | 0.69 | 0.037 | 19.5 | -------- | 1.10 |
| 84 | 0.58 | 0.033 | 9.50 | 2.63 | 1.00 |
| 108 | 0.41 | 0.023 | 3.46 | 2.90 | 1.00 |

This test indicates the ability of potassium nitrate to act as a precipitating agent in the process of the invention.

EXAMPLE VIII

A 835 gram sample of the ore used in Example I was ground for 25 minutes in the laboratory ball mill at a pulp density of approximately 50% by wt. solids and the pulp was transferred to a testing pot on the oil bath at a temperature of approximately 90° C., 200 cc. of C.P. sulphuric acid were added and the pulp was conditioned for 20 hours and a sample was taken for analysis. 25 grams of potassium carbonate were then added followed by a further 25 grams four hours later. 20 hours after the first addition of potassium carbonate, a sample was taken for analysis and the pulp was conditioned a further 20 hours, a sample was taken for analysis and 25 grams of potassium dichromate were added followed four hours later by 25 grams of potassium carbonate. An extra sample was taken for analysis three hours following the addition of the potassium dichromate. Conditioning was continued and a sample was taken for analysis at 24 hour intervals, with 25 cc. of C.P. sulphuric acid added after the last addition of potassium carbonate.

The metallurgical results were as follows:

| Time, hrs. | Ni, percent by wt. (in solids) | Co, percent by wt. (in solids) | Pregnant solution Fe, gms./l. | Pregnant solution Ni, gms./l. | pH |
|---|---|---|---|---|---|
| 20 | 1.08 | 0.070 | 49.6 | -------- | 0.7 |
| 40 | 0.57 | 0.034 | 2.82 | -------- | 1.45 |
| 60 | 0.51 | 0.033 | 0.92 | -------- | 1.9 |
| 63 | 0.50 | 0.031 | 0.20 | -------- | -------- |
| 88 | 0.47 | 0.032 | 0.21 | -------- | 1.9 |
| 112 | 0.38 | 0.031 | 0.50 | -------- | 1.7 |
| 36 | 0.34 | 0.028 | 0.36 | 4.25 | 1.85 |

The foregoing results illustrate the accelerating effect that potassium dichromate has upon the precipitating of iron where the iron in solution fell from 0.92 to 0.20 grams per liter in the first three hours following the first addition of potassium dichromate.

EXAMPLE IX

An 835 gram sample of nickel ore supplied by International Nickel Company of Canada and having a head analysis of 1.42% by wt. nickel, 0.126% by wt. cobalt and 42.2% by wt. iron was ground in the laboratory ball mill for 30 minutes at a pulp density of 50% by wt. in the presence of 200 cc. of a 10% solution of sodium silicate, 15 cc. of a 1% solution of wetting agent (a trimethyl nonyl ether of polyethylene glycol) and 20 grams of sodium carbonate. The pulp was then transferred to a testing pot on the oil bath at approximately 90° C. and conditioned for four hours when 165 cc. of C.P. sulphuric acid were added together with 10 grams of sodium carbonate. The pulp was conditioned for 16 hours, a sample was taken for analysis and 5 grams of sodium carbonate were added. Conditioning was continued for 12 hours and a sample was taken for analysis and 50 grams of sodium carbonate were added. Conditioning was continued and samples were taken for analysis every 12 hours. In this example, the iron content of the solids were determined by chemical analysis.

The metallurgical results were as follows:

| Time, hrs. | Ni, percent by wt. (in solids) | Co, percent by wt. (in solids) | Fe, percent by wt. (in solids) | Pregnant solution Fe, gms./l. | pH |
|---|---|---|---|---|---|
| 20 | 0.88 | 0.046 | 42.6 | 11.0 | 1.3 |
| 32 | 0.72 | 0.040 | 39.8 | 4.33 | 1.45 |
| 44 | 0.74 | 0.037 | 39.9 | 3.56 | 1.5 |
| 56 | 0.66 | 0.034 | 39.2 | 0.78 | 2.15 |
| 68 | 0.63 | 0.035 | 38.3 | 0.72 | 2.0 |
| 80 | 0.64 | 0.035 | 37.9 | 0.94 | 2.0 |

The above results indicate the action of sodium carbonate as an iron precipitating agent and show the course of the leach with a relatively low quantity of sulphuric acid.

While the invention has been illustrated in the foregoing examples as applied to the treatment of nickel bearing laterite ores it is obvious that it applies equally as well to beneficiated nickel bearing laterite ores and other ores or smelter or roaster products where the nickel is associated with iron and susceptible to leaching with sulphuric acid (herein referred to as "nickel mineral treated products").

What I claim as my invention is:

1. A process for the hydrometallurgical treatment of nickel bearing laterite ores, beneficiated nickel bearing laterite ores or nickel mineral treated products, said process comprising; subjecting a prepared pulp of such materials to sulphuric acid leaching at a temperature from about 70° C. to the atmospheric boiling point of the said pulp by reducing the pH of the pulp to below about 1.5 by the addition of sulphuric acid; having present in the pulp during said leaching a sufficient quantity of an iron precipitating agent selected from the group consisting of agents capable of introducing the ions of ammonium, sodium, potassium or lithium and for a sufficient period of time to cause substantial precipitation of dissolved iron contained in solution while permitting dissolution of nickel to proceed; whereby to produce a leach solution enriched in nickel values, and impoverished in soluble iron content.

2. A process as claimed in claim 1 wherein the iron precipitating agent is potassium carbonate or sodium carbonate.

3. A process as claimed in claim 2 wherein the pulp is made up with at least partially sea water.

4. A process as claimed in claim 1 wherein the iron precipitating agent is a combination of sodium chloride and potassium carbonate or sodium carbonate.

5. A process as claimed in claim 4 wherein the pulp is made up with at least partially sea water.

6. A process as claimed in claim 1 wherein said pulp is prepared by comminuting said ore in the presence of dispersion and/or wetting agents.

7. A process as claimed in claim 1 wherein the pulp is made up with at least partially sea water.

8. A process as claimed in claim 6 wherein the pulp is made up with at least partially sea water.

9. A process as claimed in claim 1 wherein the precipitation of the iron is accelerated by the introduction of potassium dichromate in addition to said iron precipitation agent during the course of said conditioning.

10. A process as defined in claim 1, wherein the relative rates of precipitation of iron and dissolution of cobalt and nickel are controlled during said leaching by the introduction to the pulp of gaseous media selected from the group consisting of carbon dioxide, sulphur dioxide and air.

11. The process of claim 1 wherein the process is carried out in the presence of an oxidizing agent.

12. The process of claim 22 wherein the process is carried out in the presence of an oxidizing agent.

13. The process of claim 1 wherein in the treatment of said pulp with sulphuric acid all of the sulphuric acid is added in one stage.

14. The process of claim 1 wherein in the treatment of said pulp with sulphuric acid the sulphuric acid is added in a number of stages.

15. The process of claim 1 wherein at least part of said iron precipitating agent is added to the pulp prior to the addition thereto of sulphuric acid.

16. The process of claim 1 wherein at least part of said iron precipitating agent is added to the pulp concurrent with the addition thereto of sulphuric acid.

17. The process of claim 1 wherein at least part of said iron precipitating agent is added to the pulp subsequent to the addition thereto of sulphuric acid.

18. The process of claim 1 wherein the said iron precipitating agent is stage added to control the amount of iron in solution.

19. The process of claim 1 wherein the iron precipitating agent is selected from the group consisting of ammonium carbonate, potassium carbonate, sodium carbonate, lithium carbonate, potassium nitrate, sodium chloride, sodium sulphate or combinations thereof.

20. A process as claimed in claim 1 wherein said pulp is prepared by comminuting said ore in the presence of sodium chloride.

21. A process for the hydrometallurgical treatment of nickel bearing laterite ores, beneficiated nickel bearing laterite ores or nickel mineral treated products, said process comprising; subjecting a prepared pulp of such materials to leaching by adding sulphuric acid to said pulp to bring the pH down to a value below about 1.5 and conditioning said pulp at a temperature of from about 70° C. to the atmospheric boiling point of the said pulp until a substantial concentration of iron is in solution, thereafter adding to said pulp predetermined quantities of an iron precipitating agent selected from the group consisting of agents capable of introducing the ions of ammonia, potassium, sodium or lithium to said pulp in quantities effective to cause substantial precipitation of the dissolved iron in said solution concurrently with the dissolution of the nickel in said material.

22. In the leaching of nickel minerals where the nickel is associated with at least one sulphuric acid soluble iron mineral and the leaching agent is sulphuric acid which lowers the pH to below about 1.5 during at least part of the leaching process the improvements which consist in the addition of a substance selected from the group consisting of agents capable of introducing the ions of ammonia, potassium, sodium or lithium to the leach in quantities effective to cause substantial precipitation of the dissolved iron in said solution while permitting the dissolution of nickel to proceed and carrying out at least part of the process at a temperature of from about 70° C. to the atmospheric boiling point of the said pulp.

References Cited
UNITED STATES PATENTS

| | | | |
|---|---|---|---|
| 2,831,751 | 4/1958 | Birner | 423—140 |
| 3,434,947 | 3/1969 | Steintvert | 423—140 X |
| 2,754,174 | 7/1956 | Roberts | 423—140 X |
| 3,130,043 | 4/1964 | Lichty | 423—140 X |
| 1,193,734 | 8/1916 | Sulman et al. | 75—115 X |
| 2,719,082 | 9/1955 | Sproule et al. | 75—119 X |
| 913,708 | 3/1909 | Dow et al. | 423—140 X |
| 3,637,371 | 1/1972 | Mackin et al. | 75—101 R |
| 3,367,740 | 2/1968 | Zubryckyj et al. | 423—150 |
| 3,466,144 | 9/1969 | Kay | 423—150 X |

HERBERT T. CARTER, Primary Examiner

U.S. Cl. X.R.

423—140, 146, 150; 75—115, 119, 108